US008358831B2

(12) United States Patent
Doe et al.

(10) Patent No.: US 8,358,831 B2
(45) Date of Patent: Jan. 22, 2013

(54) PROBE MARK INSPECTION

(75) Inventors: Rodney Doe, Seattle, WA (US); John T. Strom, North Bend, WA (US)

(73) Assignee: Rudolph Technologies, Inc., Flanders, NJ (US)

( * ) Notice: Subject to any disclaimer, the term of this patent is extended or adjusted under 35 U.S.C. 154(b) by 566 days.

(21) Appl. No.: 12/556,910

(22) Filed: Sep. 10, 2009

(65) Prior Publication Data

US 2010/0061620 A1    Mar. 11, 2010

Related U.S. Application Data

(60) Provisional application No. 61/096,182, filed on Sep. 11, 2008.

(51) Int. Cl.
*G06K 9/00* (2006.01)
(52) U.S. Cl. .......................... 382/145; 382/141; 382/149
(58) Field of Classification Search .................. 382/141, 382/145–151, 206, 286
See application file for complete search history.

(56) References Cited

U.S. PATENT DOCUMENTS

| 5,581,632 | A | 12/1996 | Koljonen et al. |
| 6,826,298 | B1 | 11/2004 | O'Dell et al. |
| 6,937,753 | B1 | 8/2005 | O'Dell et al. |
| 6,987,875 | B1 | 1/2006 | Wallack |
| 7,024,031 | B1 | 4/2006 | Castellanos-Nolasco et al. |
| 7,171,036 | B1 | 1/2007 | Liu et al. |
| 7,242,801 | B1 | 7/2007 | Wallack et al. |
| 7,729,528 | B2 * | 6/2010 | O'Dell et al. .................. 382/149 |
| 2003/0107736 | A1* | 6/2003 | Fujimoto ....................... 356/394 |
| 2006/0238905 | A1 | 10/2006 | Kurihara et al. |
| 2010/0172570 | A1* | 7/2010 | Sakai et al. .................... 382/151 |
| 2012/0076396 | A1* | 3/2012 | Sakai et al. .................... 382/145 |

FOREIGN PATENT DOCUMENTS

| DE | 69800756 T2 | 8/2001 |
| DE | 10131665 A1 | 1/2003 |

OTHER PUBLICATIONS

PCT Search Report for PCT/US09/56505, Oct. 28, 2009, 7 pages.

* cited by examiner

*Primary Examiner* — Hoa Pham
(74) *Attorney, Agent, or Firm* — Dicke, Billig & Czaja, PLLC

(57) ABSTRACT

Probe mark inspection involves a recipe based on unique image characteristics or combinations of unique image characteristics. Result images are correlated with a reference created to determine which image characteristic or combination of image characteristics provides an improved contrast.

17 Claims, 4 Drawing Sheets

PROBE MARK INSPECTION

CROSS-REFERENCE TO RELATED APPLICATION

This application is a Non-Provisional and claims the benefit of U.S. Provisional Patent Application Ser. No. 61/096,182, filed Sep. 11, 2008.

BACKGROUND OF THE INVENTION

Modern cameras and imaging systems do an excellent job of capturing highly detailed and rich images. They do this efficiently and inexpensively. The problem that remains, however, is discerning what these images have to tell us about the object that is the subject of the image.

In the semiconductor industry, electronic imaging systems are used to inspect or monitor virtually every aspect of the semiconductor device fabrication process. One area of interest is the inspection of bond pads on a semiconductor device, for example a logic circuit (processor) or memory circuit (RAM or ROM). Bond pads are conductive regions on a semiconductor device that are used to connect the semiconductor device to other electronic components. These bond pads are also used to electrically test the semiconductor device once it is has been fabricated. Small electronic probes make contact with the bond pads to connect the newly fabricated device to a tester, a computer that electronically queries the new device to ensure that it operates as desired.

When a probe makes contact with a bond pad, it is desirable to drive the probe into the bond pad to ensure proper electrical contact. If the probe does not make proper contact, the electrical test will fail and it will be unknown whether the device is bad or the electrical contact is simply insufficient. In any case, the end result is generally the same and the device will be scrapped or will at least obtain a much lower price as a second choice or the like. Accordingly, it is important to ensure that a prober, the machine that brings the probes into contact with a semiconductor device's bond pads, operates correctly.

Optical inspection is one approach for determining whether a probe and/or prober is working properly. One inspection option is to optically inspect the probe itself, an option that will not be discussed other than in passing in this application. Another option inspection is to inspect the bond pads on the semiconductor device to see if the probes properly contacted the device. Images of the bond pads of a semiconductor device are captured and inspected to determine whether the probe contacted the bond pad at all, and if so, where. It is also desirable to inspect the marks made by the probes, unimaginatively called probe marks, to determine if the probe had too light a contact, too heavy a contact, or contact that was just right. Given that the geometry of the probe itself is known, the size of the probe mark is indicative of how deep the mark is. It is undesirable for a probe mark to extend into layers of a semiconductor device below the bond pad as this can cause shorting in the device. Further, if too light a contact is made, it is likely that electrical conduction will not take place or will be intermittent.

SUMMARY OF THE INVENTION

Aspects of concepts presented herein relate to inspection of probe marks formed on a semiconductor device. In one aspect, a method of creating a recipe involves creating one or more inspection result images. Each inspection result image is based on a unique image characteristic or a unique combination of image characteristics. Each of the one or more inspection result images are correlated with a reference created to determine which image characteristic or combination of image characteristics provides an improved contrast for subsequent images.

Another aspect relates to an optical inspection system for analyzing contact between conductive probes and bond pads on a semiconductor device. An image of the bond pads having probe marks formed thereon is accessed. The image is processed according to a predetermined recipe for identifying the probe marks. Locations for the probe marks are identified from the processed image and potential adjustments are determined between the conductive probes and the semiconductor device as a function of the locations of the probe marks.

DETAILED DESCRIPTION OF THE INVENTION

Figure 1:
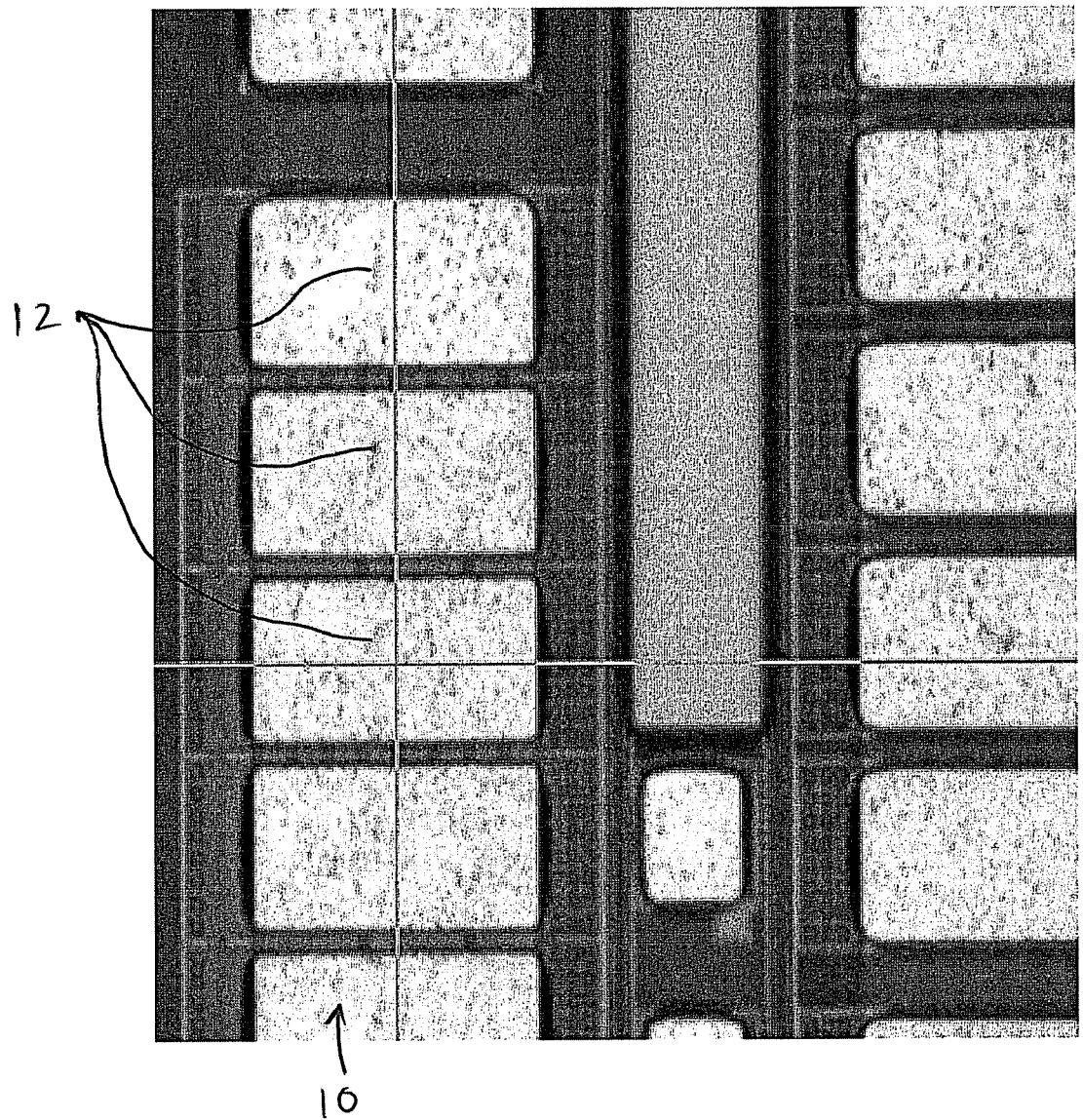
FIG. 1 is an image of a portion of a semiconductor device.

As can be seen in FIG. 1, one problem is that probe marks on a bond pad, while present, can be difficult to distinguish. In FIG. 1, bond pads 10 are made of gold and are characterized by a speckly finish. While each of the bond pads 10 has a probe mark 12 on it, it is difficult for the human eye, which is much better at discerning subtle patterns than is a computer, to pick out the location and extent of the probe marks. Exemplary probe marks 12 that are visible have been identified in FIG. 1. The problem, to put it more generally, is to discern the presence or extent of a feature on a semiconductor device where the semiconductor device is characterized by features, defects or noise that makes it difficult to distinguish the presence of the feature of interest. Note that each semiconductor device may have a different appearance owing to the use of different materials or processes in its fabrication. Accordingly, it is difficult to use a one size fits all approach when it comes to identifying a feature of interest on a semiconductor device.

Accordingly, there is a need for a methodology, preferably automated, that will assist a user to identify those settings of an optical inspection system and/or the software that operates the same that must be modified to accurately and reliably identify the presence and extent of a feature of interest, be it a defect, a probe mark, a variation or the like.

Concepts presented herein relate to a method of inspecting bond pads having a high degree of speckle or other noise to identify the presence and extent of probe marks thereon. The terms "noise" and "speckle" are used loosely herein to refer to any features that appear on a bond pad that are not a probe mark. A bond pad with no noise or speckle would have a uniform color and appearance. Note that most bond pads exhibit a noise or speckle and that some can be quite difficult to inspect as a result of the presence of noise or speckle.

The concepts also relate to a method of rapidly identifying suitable settings or arrangement of an optical inspection system to permit the inspection of an object in a manner in which noise and/or speckle are reduced or removed.

Figure 2:
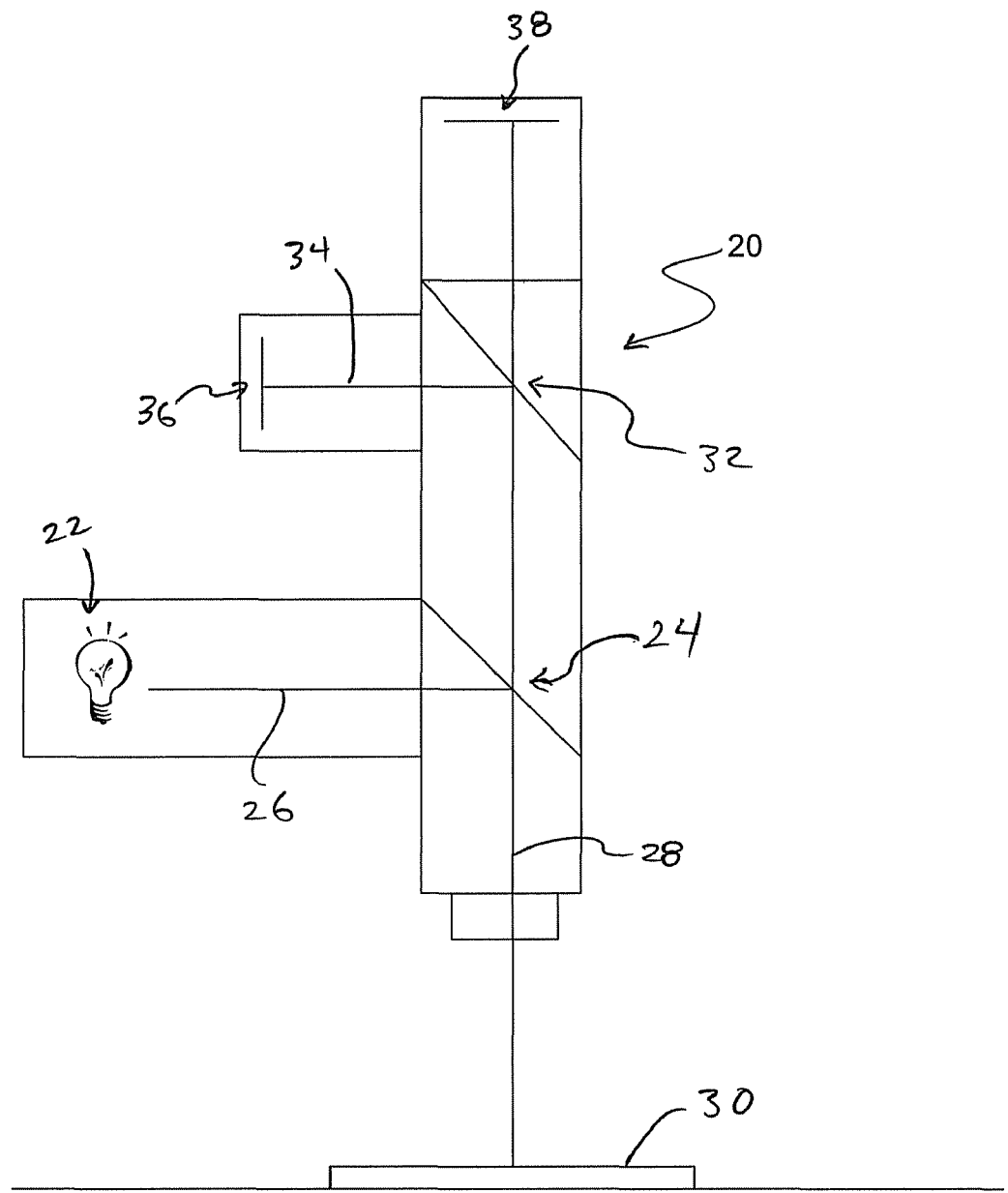
FIG. 2 is a schematic diagram of an optical inspection system.

FIG. 2 illustrates schematically an optical inspection system 20 for capturing an image of an object to be inspected. System 20 is represented as having only a brightfield illumination system, but those skilled in the art will readily appreciate that the inclusion of darkfield illumination, either in conjunction with brightfield illumination or apart therefrom, may be useful in an inspection system. Illuminator 22 outputs illumination of one or more wavelengths (i.e. may essentially be broadband and/or monochromatic, or some subset thereof) to beam splitter 24. Beam splitter 24 passes a portion of the illumination traveling along optical path 26 directly therethrough to be captured in a photon motel or the like (not shown). The remainder of the light is directed downward along optical path 28 to the object 30 (e.g. a semiconductor device) which reflects and/or scatters the incident radiation to form a signal or wavefront that passes back up optical path 28, through beam splitter 24 to beam splitter 32. Note that as before, only a portion of the light incident on beam splitter 24 is passed therethrough to beam splitter 32. In this type of illumination/imaging system, it is important to provide sufficient light to obtain good images and to properly select the beam splitters to be efficient and to maintain a proper spectral spread for the light passed therethrough.

Light incident upon beam splitter 32 is split and a portion thereof is reflected along optical path 34 to a first imager 36. The remainder of the light incident on the beam splitter 32 passes therethrough on optical path 28 and is incident upon a second imager 38. For clarity's sake, many optical elements such as lenses, filters and stops have been omitted. Moreover, processing elements coupled to system 20 and utilized to analyze and process the images below have further been omitted. Those skilled in the art will appreciate that the specific choice of such optical elements and processing elements will differ from application to application, but will understand the operation of the present invention nonetheless.

First and second imagers 36 and 38 may be CCD, CMOS or any other suitable type of sensor capable of capturing an electronic image and transferring it to a processor (not shown) for manipulation, modification and parsing. The imagers 36 and 38 maybe part of a camera assembly and may have optical elements of the usual type associated therewith. It is further to be understood that the imagers 36 and 38 and the illuminator 22 may be physically separated from one another and may be continuously, intermittently or selectively be coupled to a processor (not shown) to further the operation of the system 20.

In one embodiment imagers 36 and 38 are color and black/white imagers, respectively. Other combinations are also possible. Where imagers share a beam splitter in the manner shown in FIG. 2, it is desirable to align the imagers, the one to the other such that there is a known pixel to pixel relationship between the resulting images. This permits easier comparison of the images themselves. Where manual alignment is not provided, images may be aligned based on features in the image itself as is known in the art. In some embodiments of system 20, only a single color imager will be provided. A grayscale (black/white) image maybe derived from a color image by known methods.

Figure 3A:
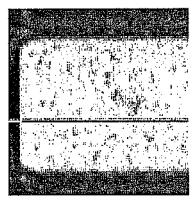
FIGS. 3a-3g are successive images of a bond pad subject to image processing steps involved in probe mark inspection.
Figure 3B:
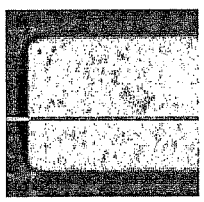
Figure 3C:
Figure 3D:
Figure 3E:
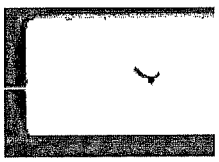

A generic inspection of an object such as a bond pad may be carried out in a number of ways including using simple thresholding techniques, using statistical based models or by using direct image subtraction. As there is less data in a grayscale image, it is generally quite efficient to do an inspection on a grayscale image. In one embodiment, a color image maybe obtained as shown in FIG. 3a. The color image is converted to a grayscale image as shown in FIG. 3b. A thresholding operation is performed on the grayscale image of FIG. 3b to remove all pixels having an intensity value below a selected threshold, the result of which is shown in FIG. 3c. At this stage, one can appreciate the number and magnitude of speckles or noise in the image. To help remove noise, any of a number of image processing functions can be used. In the present invention, an erode algorithm is applied to the image to decrease the sizes of the features in the image (probe mark and noise) and to remove small anomalies (noise) by subtracting features with a radius smaller than the structuring element, which is a feature size value that may be selected by the user. FIG. 3d represents the image of FIG. 3c after an erode algorithm is applied thereto. Note that the erode algorithm may be applied any useful number of times, the criteria being that the results of the algorithm will yield useful data. FIG. 3e represents the image after a second erode operation.

Figure 3F:
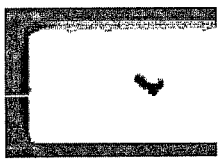
Figure 3G:
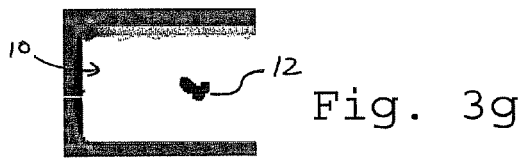

Once noise has been reduced or eliminated, the remaining feature, which in this case is bond pad 12, may be expanded to more closely approximate its actual appearance using an image processing algorithm known as dilate. With binary images such as the bond pad in FIG. 3e, dilation connects areas that are separated by spaces smaller than the structuring element (which is a feature size value that may be selected by the user) and adds pixels to the perimeter of each image object such as bond pad 10. FIG. 3f represents the image after a first application of a dilation algorithm. FIG. 3g presents the results of the second application of the dilate algorithm. Note that care should be taken to apply the correct erode and dilation structuring elements so that the size of the resulting features in an image are correct.

Figure 4:
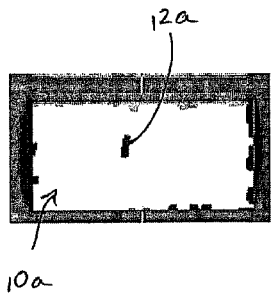
FIG. 4 is an image of a bond pad resulting from processing steps shown in FIGS. 3a-3g.

The probe mark 12 is clearly visible in FIG. 3g. However, when the same process represented by FIGS. 3a-3g is performed on another bond pad 10a in which the probe mark is not readily apparent, the results shown in FIG. 4 are obtained. Note that the probe mark 12a in the center of the image is approximately the same size and shape as some of the speckles/noise that remain around the edges of the image. This result may not be interpreted correctly by an automated inspection system as the system has returned results that are indeterminate. Any of the blobs on the bond pad could be recognized as a probe mark.

Figure 5A:
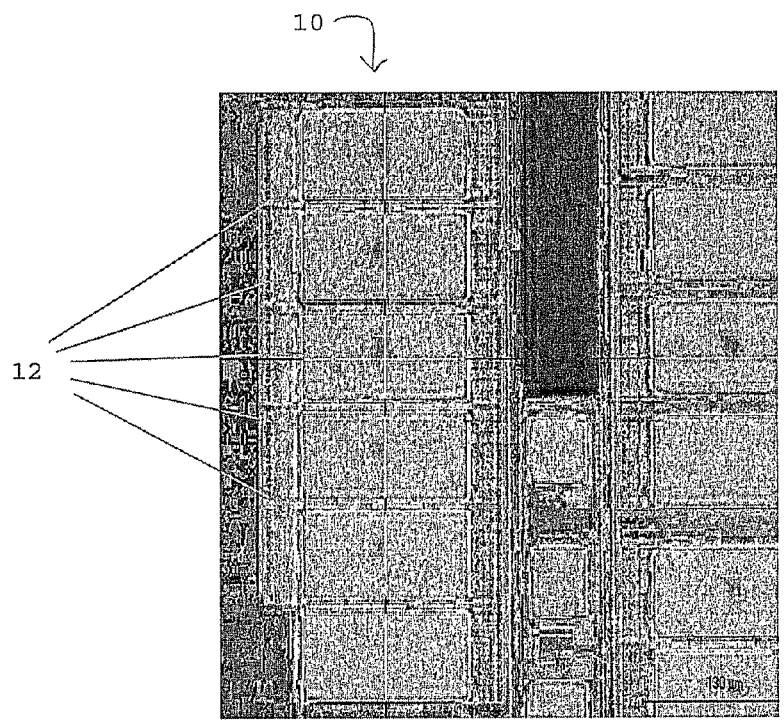
FIG. 5a is an image of a plurality of bond pads on a semiconductor device.
Figure 5B:
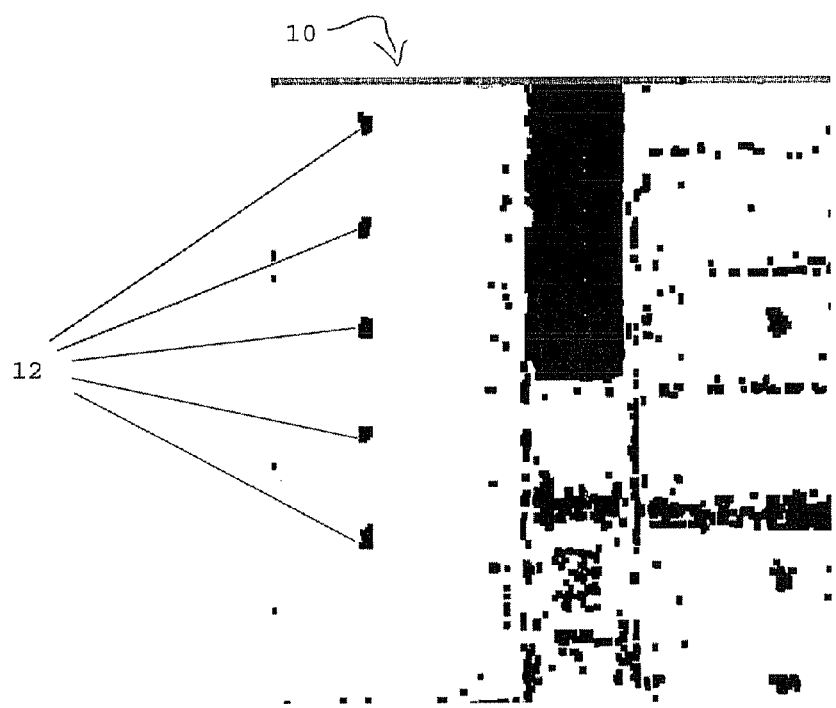
FIG. 5b is an image of the plurality of bond pads shown in FIG. 5a after image processing steps shown in conjunction with FIGS. 3a-3g.

It has been found that the use of other image variables may improve the resolution of the inspection system 20. In one embodiment, gold bond pads having a high degree of noise or speckle such as those shown in FIG. 1 were successfully inspected using saturation data obtained by decomposing a color image into an HSV (hue, saturation, value) color space representation. Note that any suitable color space may be used including, but not limited to grayscale, HSV, HSL, RGB, sRGB, or CMYK. In the present embodiment, rather than obtaining or creating a grayscale image before performing an inspection routine as described in conjunction with FIGS. 3a-3g, a color image, if not already represented electronically in an HSV format, is decomposed to represent it so. As can be seen in FIG. 5a, the saturation data readily reveals the probe marks 12 in bond pads 10. After processing the bond pad images as described in conjunction with FIGS. 3a-g, the results can be seen in FIG. 5b.

Recognizing that not all substrates may be readily inspectable using the same grayscale, HSV, RGB, etc. color space data or variables each time, it is important to use that information from an image that will provide the best outcome time and time again. This method may apply to many types of inspection systems but will be described in the context of a bond pad inspection. Note also that while the embodiment that is to be described hereinbelow will address a method used in setting up a bond pad inspection recipe, it is possible that a similar method may be used on an inspection by inspection basis to modify the inspection recipe as a substrate changes due to process variation or variation between lots of the substrate or the like.

In a first step, an image is obtained. As described above, a single color image may be used or multiple color and/or grayscale images that are aligned or unaligned with respect to one another. One the image is obtained, one or more features of interest, such as a probe mark is identified within the image. This may be done by providing the results of a previous inspection such as by providing a KLARF file with inspection results, with or without the associated images. This method allows the process to occur without significant human intervention. In another embodiment, a human operator identifies a feature or defect by selecting one or more pixels within the body thereof or by defining the boundary of the feature or defect. This can be done graphically using a cursor to highlight and/or draw as is known in the art. It can also be done by modifying information in a database. Blob analysis tools and techniques such as the erode and dilate functions can be used to find the extents/boundaries of the defect/feature by growing the blob from the selected pixels. In either case, once this step is complete, the processor is "aware" of the selected feature, which can then be used as a comparator in later steps.

A next step involves preparing representations of the bond pad image using image characteristics obtained from any of the aforementioned or other color spaces. For example, as described above, an image may be processed as described in conjunction with FIGS. 3a-g using hue, saturation, value, lightness, grayscale, red, green, blue, or any combination of these or other color space characteristics.

The resulting images are next assessed to determine the degree of correlation with the image in which a defect or feature was previously identified. As electronic images are essentially an array or matrix having rows and columns that correspond to the pixels of the imager, the values of each cell being one of the selected color space image characteristics (or a combination thereof), matrix correlation/comparison may be used to identify degree of correlation in which a score is generated based on a pixel by pixel comparison of the various results images. As the images will be, by user selection, matrices of the same size, one might simply subtract one matrix from the other and analyze the differences. The larger the difference, the lower the correlation and vice versa. Further, one might weight the differences in the matrices to ensure that differences or similarities in the feature of interest have more importance in the analysis. Where a high degree of correlation exists, it can be said that the image characteristics used to create the correlated image are likely to provide the necessary contrast to conduct an inspection.

Note that the process may be iterative in that a processor may be programmed to analyze a small number of image characteristics as a first assessment and then may refine or reject any of the resulting correlations to seek out new ones or to optimize new ones.

In lieu of using a correlation step, it is possible that result images for each of the various selected image characteristics may be created and then compared directly with one another to identify those images that agree on the presence or absence of a feature. Thereafter, those images that agree with one another may be assessed by direct comparison as by image subtraction to identify a likely candidate. Note that intervention by a user may be facilitated by mechanism for scrolling between the various result images so that the user of the system 20 may identify the most likely candidates.

Such an automated recipe setup system may provide recommendations to a user that is monitoring or conducting the system setup or it may automatically modify the inspection parameters used for inspection so that the proper image characteristics are used for an inspection.

Although the present invention has been described with reference to preferred embodiments, workers skilled in the art will recognize that changes can be made in form and detail without departing from the spirit and scope of the present invention.

What is claimed is:

1. A method of creating a recipe involving creating one or more inspection result images, each inspection result image being based on a unique image characteristic or a unique combination of image characteristics, whereafter each of the one or more inspection result images are correlated with a reference created to determine which image characteristic or combination of image characteristics provides an improved contrast that is at least a partial basis for the inspection of substrates that is conducted using subsequently obtained inspection images.

2. The method of claim 1 wherein the recipe is automatically modified to reflect the use of the identified image characteristic or combination.

3. The method of claim 1 further comprising identifying a degree of correlation between the one or more inspection result images and the reference.

4. The method of claim 3 further comprising generating a score for the degree based on a pixel by pixel comparison of the one or more inspection result images and the reference.

5. The method of claim 1 further comprising assigning different weights to different image characteristics or combinations.

6. The method of claim 1 further comprising iteratively modifying the recipe based on a plurality of inspections.

7. The method of claim 1 further comprising using an optical inspection system configured to identify a feature as a function of the recipe.

8. An optical inspection method for analyzing contact between conductive probes and bond pads on a semiconductor device, comprising:
   obtaining one or more representative images of the bond pads and creating one or more inspection result images from the one or more representative images, each inspection result image being based on a unique image characteristic or a unique combination of image characteristics, whereafter each of the one or more inspection result images are scored with respect to a reference created to determine which image characteristic or combination of image characteristics provides an improved contrast that may form at least a partial basis for the subsequent inspection of substrates that is conducted using subsequently obtained inspection images, the at least partial basis comprising part of a recipe for inspection of probe marks on a bond pad;
   accessing an image of the bond pads having probe marks formed thereon;
   processing the image according to the recipe for identifying the probe marks;
   identifying locations for the probe marks from the processed image; and
   determining potential adjustments between the conductive probes and the semiconductor device as a function of the locations of the probe marks.

9. The method of claim 8 wherein the predetermined recipe includes converting the image from a color image to a grayscale image.

10. The method of claim 8 wherein the predetermined recipe includes comparing pixel intensity values to a threshold.

11. The method of claim 8 wherein the predetermined recipe includes applying an erode algorithm to the image.

12. The method of claim 11 wherein the predetermined recipe includes applying a second erode algorithm after application of the first-mentioned erode algorithm.

13. The method of claim 8 wherein the predetermined recipe includes applying a dilation algorithm.

14. The method of claim 13 wherein the predetermined recipe includes applying a second dilation algorithm after application of the first-mentioned dilation algorithm.

15. The method of claim 8 further comprising:

positioning the semiconductor device with respect to an optical inspection system; and capturing the image using the optical inspection system.

16. The method of claim 15 further comprising:

transferring the image from the optical inspection system to a processing element; and utilizing the processing element to process the image according to the recipe.

17. The method of claim 8 further comprising modifying the predetermined recipe based on identification of the probe marks.

* * * * *